(12) United States Patent
Murray

(10) Patent No.: US 11,631,126 B2
(45) Date of Patent: Apr. 18, 2023

(54) METHODS AND SYSTEMS FOR PERSISTENT CONTEXTUAL INTERACTION

(71) Applicant: JPMorgan Chase Bank, N.A., New York, NY (US)

(72) Inventor: Craig Murray, Spring Hill, TN (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 164 days.

(21) Appl. No.: 16/515,843

(22) Filed: Jul. 18, 2019

(65) Prior Publication Data

US 2020/0043089 A1 Feb. 6, 2020

Related U.S. Application Data

(60) Provisional application No. 62/715,105, filed on Aug. 6, 2018.

(51) Int. Cl.
*G06Q 40/00* (2023.01)
*G06Q 40/02* (2023.01)
*H04L 67/10* (2022.01)
*G06Q 30/016* (2023.01)
*H04L 67/60* (2022.01)
*H04L 67/01* (2022.01)

(52) U.S. Cl.
CPC .......... *G06Q 40/02* (2013.01); *G06Q 30/016* (2013.01); *H04L 67/10* (2013.01); *H04L 67/60* (2022.05); *H04L 67/01* (2022.05)

(58) Field of Classification Search
CPC ............................ G06Q 40/00; H04L 41/5058
USPC ............................................................ 705/35
See application file for complete search history.

(56) References Cited

U.S. PATENT DOCUMENTS

2012/0058742 A1\* 3/2012 Razoumov .......... H04L 41/5058
455/406

\* cited by examiner

*Primary Examiner* — Ojo O Oyebisi
(74) *Attorney, Agent, or Firm* — Greenblum & Bernstein, P.L.C.

(57) ABSTRACT

Systems and methods for achieving persistent interaction comprise receiving a first communication via a first communication channel, the first communication including a first service request; initiating a response to the first service request; storing information related to a first context of the first communication; in response to the first communication being terminated, storing a first stage information related to completion of the response to the first service request; receiving a second communication via a second communication channel, the second communication including a second service request; in response to the first service request being the same as the second service request, retrieving the information related to the first context; retrieving the first stage information; resuming the response to the first service request; storing information related to a second context and a second stage of completion of the second service request; and storing a second stage of completion of the response.

19 Claims, 10 Drawing Sheets

8:42 AM

Hi, Kim. How can I help?

Pay AT&T bill

Sure! You're current AT&T bill total is $119.00 and is due October 14th. How would you like to proceed?

Pay in full

Pay minimum

I'll pick the amount

FIG. 5A

Hi, Kim. How can I help?

Pay AT&T bill

Sure! You're current AT&T bill total is $119.00 and is due October 14th. How would you like to proceed?

Pay in full

Pay minimum

I'll pick the amount

Pay in full

FIG. 5B

I'll pick the amount

Pay in full

OK. From which account do you want to send the money?

Chase Ck (...8787) $5,098.55

Chase Sav (...4141) $17,020.00

Chase Ck (...3366) $8,234.16

Chase Ck (...8787) $5,098.55

Chase Ck (...8787) $5,098.55

8:44 AM

Just 1 last step. Confirm payment details and when to send the $.

Confirm payment

Payment sent. Here's the info..

Payment summary

AT&T Wireless
(...9191)

Transaction number | Status
2334568891 | Pending

Paid with
Chase Ck (...8787)

Deliver by
Oct 18, 2017

Total          $119.00

METHODS AND SYSTEMS FOR PERSISTENT CONTEXTUAL INTERACTION

PRIORITY TO RELATED APPLICATION

This application claims priority to U.S. Provisional Application No. 62/715,105, filed on Aug. 6, 2018, the contents of which being incorporated herein by reference in their entirety.

BACKGROUND

1. Field of the Disclosure

This technology generally relates to methods and systems for providing persistent contextual interaction. In particular, this technology relates to methods and systems for providing persistent and contextual customer communication with no loss of information due to interruption of the communication.

2. Background Information

Customers typically have a number of requirements or requests from their various service providers such as, e.g., their bank, with respect to their money and/or other assets or services. In particular, a typical customer may contact their bank via a plurality of communication channels such as, e.g., email, social network, smart speaker or voice-activated instructions, telephone, text messaging, chat messaging, personal appearance at a branch location, or other method, in order to obtain information with respect to a service or transaction, e.g., an ongoing mortgage application, opening a new account, directing specific investments in an investment account, and the like. However, given the ever-growing list of communication channels that are typically available to customers, the communication channels including various devices and platforms allowing a customer to communicate with their service provider such as, e.g., their bank, it may become difficult to track the customer's requests, and the context and status thereof, when different communication channels are used by the customer. Particularly, it may become difficult to track the customer's requests in case of interruption of a communication undertaken via one of the communication channels and resumed via another communication channel. For example, if a customer started a loan application via the phone, then requested an update via chat messaging, and submitted additional information via email, it may be difficult for the service provider, e.g., the bank, to keep track of its interaction with the customer in an organized chronological manner over the different communication channels.

Therefore, there is a need for methods and systems allowing a service provider such as a bank the ability to track customer interactions with respect to customers' needs, requests and expectations in view of an ever-growing list of available services and across a number of different communication channels. There is also a need to trach customer interactions in a simplified, organized and sequential manner. Specifically, there is a need for the persistent display of all interactions via all communication channels in one place such as, e.g., on a display screen or a mobile application at the service provider, and for keeping a historical log of actions taken or that have yet to be taken.

SUMMARY

The present disclosure, through one or more of its various aspects, embodiments, and/or specific features or sub-components, provides, inter alia, various systems, servers, devices, methods, media, programs, and platforms for providing persistent communication with a customer. Specifically, the various aspects, embodiments, features, and/or sub-components provide the ability to persist a communication with a given customer, even when the customer has used various communication channels with the service provider, e.g., the bank, and even when a communication with the customer has been interrupted one or more times. The various communication channels include email, social network, smart speaker or voice-activated instructions, telephone, text messaging, chat messaging, personal appearance at a branch location, or other method.

According to an aspect of the present disclosure, a method for persistent interaction via a plurality of communication channels is provided. The method is implemented by a processor on a computing device. The method includes receiving, by the processor, a first communication via a first channel of the plurality of communication channels, the first communication including a first service request; initiating, by the processor, a response to the first service request based on the first communication; and storing, by the processor, information related to a first context of the first communication in a memory of the computing device. In response to the first communication being terminated, the method further comprises storing, by the processor, information related to a first stage of completion of the response to the first service request in the memory of the computing device; receiving, by the processor, a second communication via a second channel of the plurality of communication channels, the second communication including a second service request; storing, by the processor, information related to a second context of the second service request in the memory of the computing device; and determining, by the processor, whether the second service request is equivalent to the first service request. In response to the second service request being equivalent to the first service request, the method further comprises retrieving, by the processor, the information related to the first context; retrieving, by the processor, the information related to the first stage of completion of the response to the first service request; resuming, by the processor, the response to the first service request from the first stage of completion based on at least one of the information related to the first context and the information related to the second context; and storing, by the processor, information related to a second stage of completion of the response to the second service request in the memory of the computing device. In response to the first service request being different from the second service request, the method further comprises initiating, by the processor, a response to the second service request based on the second context.

According to another aspect of the present disclosure, a computing device configured to implement an execution of a method for persistent interaction via a plurality of communication channels is provided. The computing device includes a display screen, a processor, a memory, and a communication interface coupled to each of the processor, the memory, and the display screen. When the method is being executed, the processor is configured to: receive, via the communication interface, a first communication via a first channel of the plurality of communication channels, the first communication including a first service request; initiate a response to the first service request based on the first communication; and store information related to a first context of the first communication in a memory of the computing device. In response to the first communication being terminated, the processor is configured to store information related to a first stage of completion of the response to the first service request in the memory of the computing device; receive a second communication via a second channel of the plurality of communication channels, the second communication including a second service request; store information related to a second context of the second service request in the memory of the computing device; and determine whether the second service request is equivalent to the first service request. In response to the second service request being equivalent to the first service request, the processor is configured to retrieve the information related to the first context; retrieve the information related to the first stage of completion of the response to the first service request; resume the response to the first service request from the first stage of completion based on at least one of the information related to the first context and the information related to the second context; and store information related to a second stage of completion of the response to the second service request in the memory of the computing device. In response to the first service request being different from the second service request, the processor is configured to initiate a response to the second service request based on the second context.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 5A-5D illustrate a process for persistent interaction via a plurality of communication channels, according to an example embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
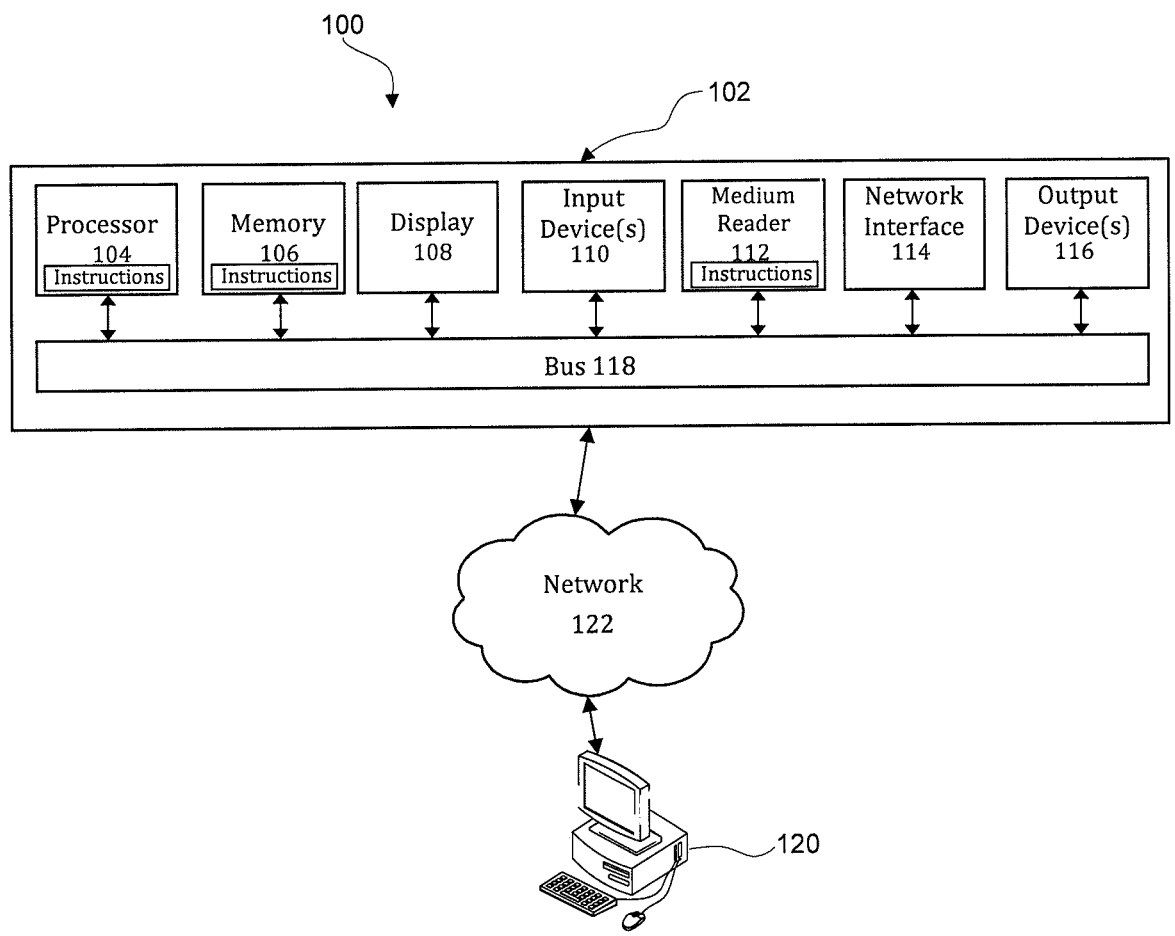
FIG. 1 illustrates a computer system for implementing persistent interaction via a plurality of communication channels, according to an example embodiment.

FIG. 1 illustrates a computer system for implementing persistent interaction via a plurality of communication channels, according to an example embodiment. According to example embodiments, a system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
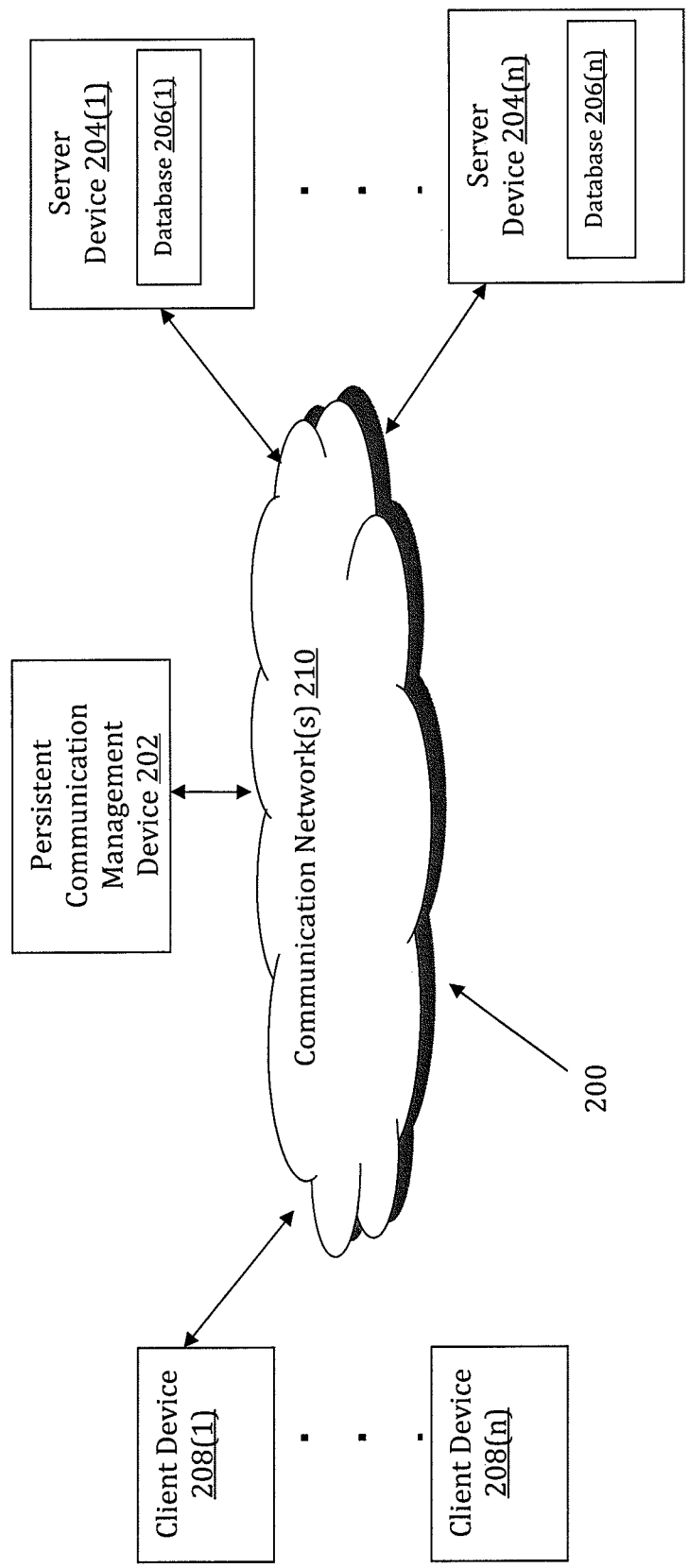
FIG. 2 illustrates a diagram of a network environment for persistent interaction via a plurality of communication channels, according to an example embodiment.

Referring to FIG. 2, a schematic of an example persistent communication system 200 for implementing persistent communication is illustrated. In an example embodiment, the persistent communication framework is executable on any networked computer platform, such as, for example, a wireless mobile communication device, i.e., a smart phone.

A Persistent Communication Management (PCM) device 202 may be the same or similar to the computer system 102 described with respect to FIG. 1. The PCM device 202 may store one or more applications that can include executable instructions that, when executed by the PCM device 202, cause the PCM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PCM device 202 itself, may be located in virtual server(s) running in a cloud-based computing environment rather than being tied to one or more specific physical network computing devices. Also, the application(s) may be running in one or more virtual machines (VMs) executing on the PCM device 202. Additionally, in one or more embodiments of this technology, virtual machine(s) running on the PCM device 202 may be managed or supervised by a hypervisor.

In the persistent communication system 200 of FIG. 2, the PCM device 202 is coupled to a plurality of server devices 204(1)-204(n) that hosts a plurality of databases 206(1)-206(n), and also to a plurality of client devices 208(1)-208(n) via communication network(s) 210. A communication interface of the PCM device 202, such as the network interface 114 of the computer system 102 of FIG. 1, operatively couples and communicates between the PCM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PCM device 202, the server devices 204(1)-204(n), and/or the client devices 208(1)-208(n) may be coupled together via other topologies. Additionally, the persistent communication system 200 may include other network devices such as one or more routers and/or switches, for example, which are well known in the art and thus will not be described herein. This technology provides a number of advantages including methods, non-transitory computer readable media, and persistent communication management devices that efficiently communicate with customers via a plurality of communication channels without loss of information due to crossing from one communication channel to another.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PCM device 202 may be a standalone device or integrated with one or more other devices or apparatuses, such as one or more of the server devices 204(1)-204(n), for example. In one particular example, the PCM device 202 may include or be hosted by one of the server devices 204(1)-204(n), and other arrangements are also possible. Moreover, one or more of the devices of the PCM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PCM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store contextual information or data, customer identity (ID) data, and data that relates to services available to customers.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of persistent communication. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PCM device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary persistent communication system 200 with the PCM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the persistent communication system 200, such as the PCM device 202, the server devices 204(1)-204(n), or the client devices 208(1)-208(n), for example, may be configured to operate as virtual instances on the same physical machine. In other words, one or more of the PCM device 202, the server devices 204(1)-204(n), or the client devices 208(1)-208(n) may operate on the same physical device rather than as separate devices communicating through communication network(s) 210. Additionally, there may be more or fewer PCM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
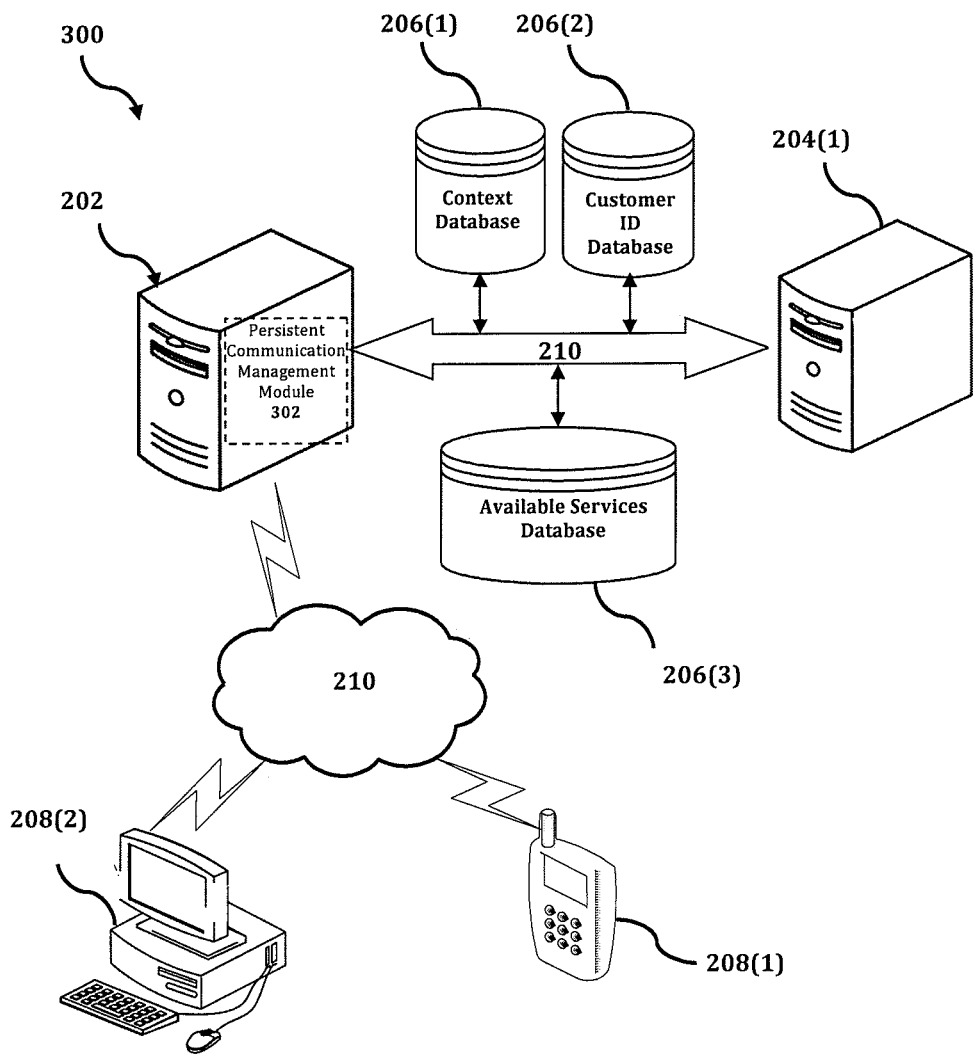
FIG. 3 shows a system for persistent interaction via a plurality of communication channels, according to an example embodiment.

The PCM device 202 is described and shown in FIG. 3 as including a Persistent Communication Management (PCM) module 302, although it may include other rules, policies, modules, databases, or applications, for example. As will be described below, the PCM module 302 is configured to manage persistent communication with a client, or a client device, via a plurality of channels of communication.

An exemplary process 300 for implementing a persistent communication framework for a service by utilizing the network environment of FIG. 2 is shown as being executed in FIG. 3. Specifically, a first client device 208(1) and a second client device 208(2) are illustrated as being in communication with PCM device 202. In this regard, the first client device 208(1) and the second client device 208(2) may be "clients" of the PCM device 202 and are described herein as such. Nevertheless, it is to be known and understood that the first client device 208(1) and/or the second client device 208(2) need not necessarily be "clients" of the PCM device 202, or any entity described in association therewith. Any additional or alternative relationship may exist between either or both of the first client device 208(1) and the second client device 208(2) and the PCM device 202, or no relationship may exist.

Further, PCM device 202 is illustrated as being able to access a contextual information database 206(1), a customer ID database 206(2), and a database 206(3) including the services available to customers. The PCM module 302 may be configured to access these databases for implementing persistent communication with a customer.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PCM device 202 via broadband or cellular communication. Of course, these embodiments are merely exemplary and are not limiting or exhaustive.

Upon being started, the PCM module 302 executes a process for persistent communication. An exemplary process for implementing persistent communication is generally indicated at flowchart 400 in FIGS. 4A-4B.

Figure 4A:
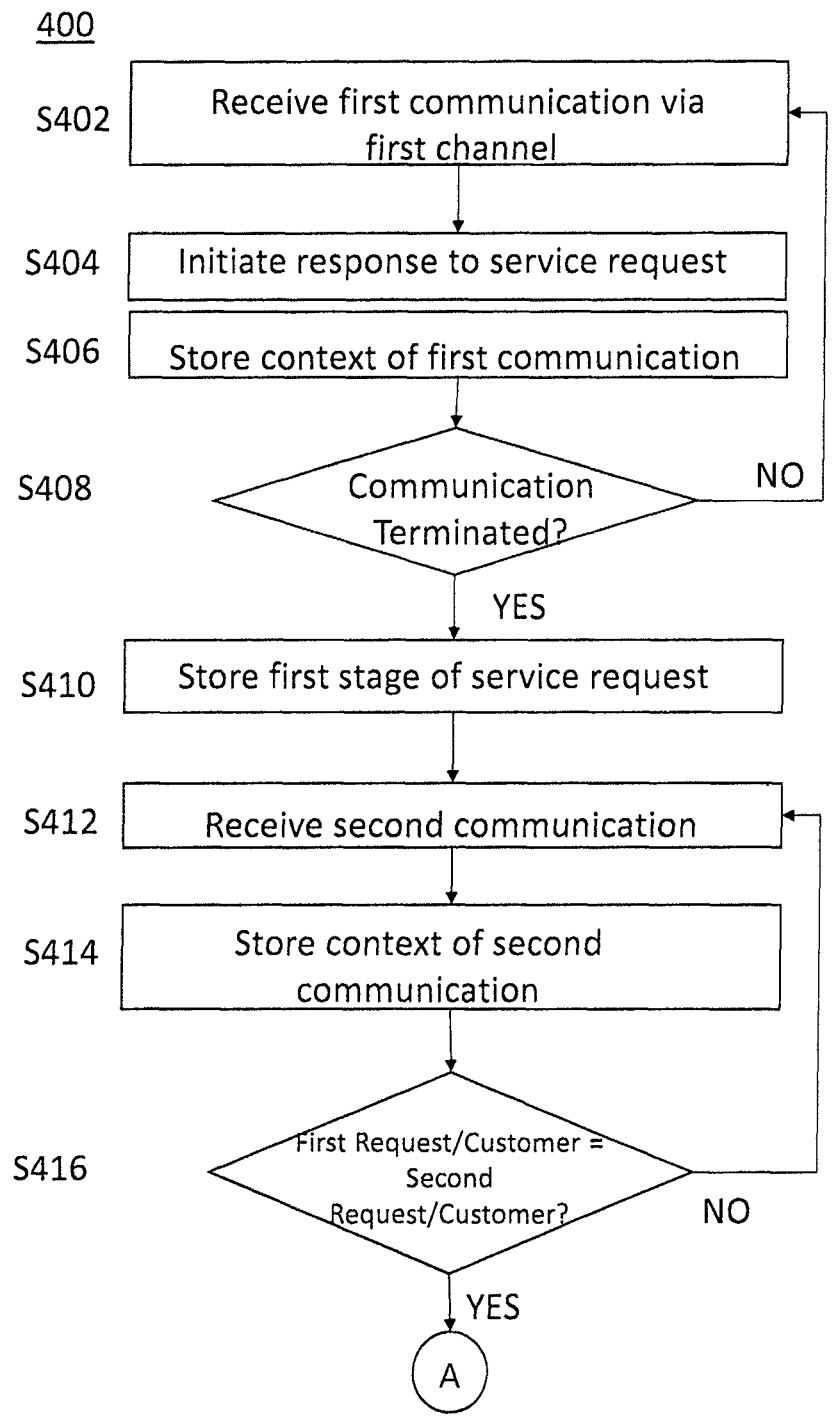
FIGS. 4A-4B are flowcharts of a process for persistent interaction via a plurality of communication channels, according to an example embodiment.
Figure 4B:
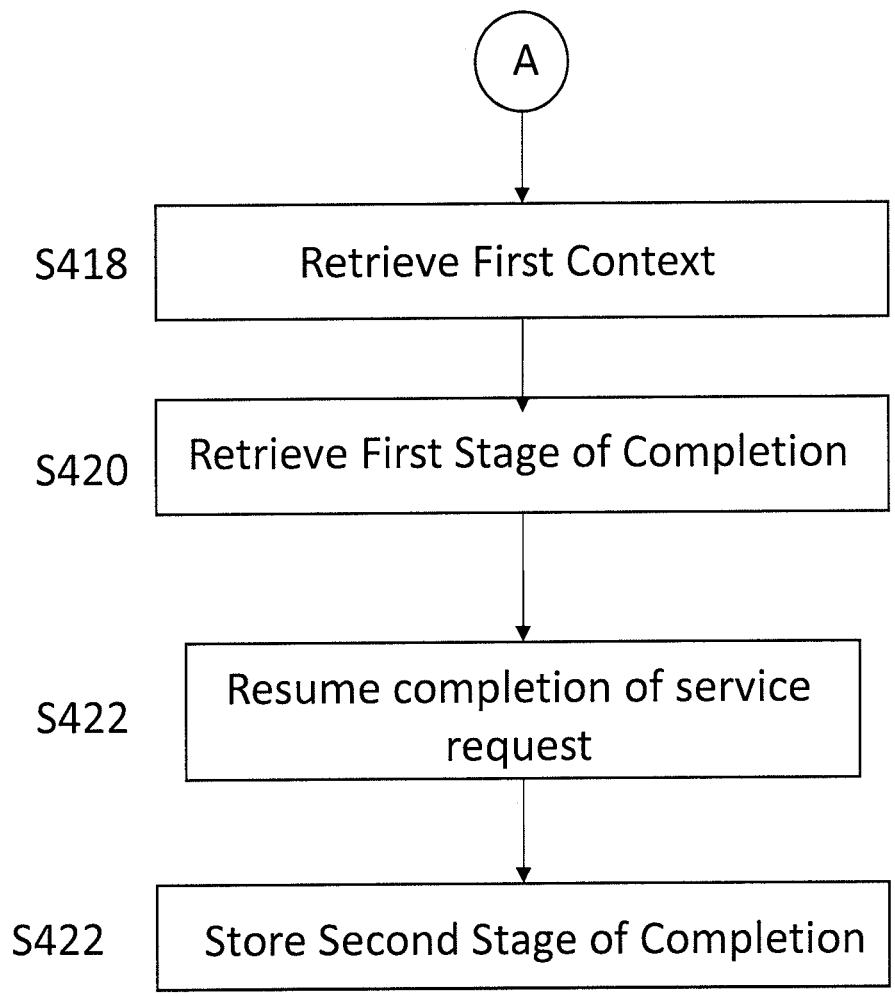

In the process 400 of FIGS. 4A-4B, while executing the web application, at step S402, the PCM module 302 receives a first communication from a first customer via a first channel of communication. In example embodiments, the PCM module 302 receives the first communication via one of, e.g., an email, a social network, a smart speaker or voice-activated instructions, a telephone, text messaging, chat messaging, and personal appearance at a branch location. In example embodiments, the first communication may be related to one or more of a plurality of services such as, e.g., a bill payment, a loan application, an investment consultation, and the like. In example embodiments, the PCM module 302, upon receiving the first communication, determines the identity or profile of the first customer initiating the first communication, the communication channel used by the first customer, and the first service request. In example embodiments, the identity of the first customer includes a name of the first customer, a physical address of the first customer, a telephone number of the first customer, an internet address, e.g., an IP address, of a device used by the first customer, a social security number of the first customer, or other identifying characteristic or code uniquely identifying the first customer. In example embodiments, the PCM module 302 determines the identity of the first customer by, e.g., recognizing a voice of the first customer, receiving a name or a code provided by the first customer, recognizing an internet address of the device used by the first customer, and/or determining a geolocation of the first customer based on the internet address of the device used by the first customer. In example embodiments, the PCM module 302 stores the first customer identification in the customer ID database 206(2) illustrated in FIG. 3.

In example embodiments, at step S404, the PCM module 302 initiates a response to the first service request. For example, the response to the first service request may be providing payment options to satisfy a bill, taking information in view of a loan qualification, and the like.

In example embodiments, at step S406, the PCM module 302 stores information related to a context of the first communication with the first customer in a database such as, for example, the context database 206(1) described with respect to FIG. 3. In example embodiments, the information related to the context, also referred to as contextual information, of the communication may include any one of a nature of a service request, a customer sentiment with respect to the service request, a parameter of a transaction, e.g., a price or interest rate, an asset involved in the transaction, e.g., a car or a house, and/or a time or date of the service request. In example embodiments, the PCM module 302 stores the contextual information of the communication in the contextual information database 206(1) illustrated in FIG. 3.

In example embodiments, at step S408, the PCM module 302 determines whether the first communication with the first customer has been terminated. In example embodiments, the first communication may be terminated either intentionally by the client or unintentionally. For example, the first client may be temporarily distracted by an event, a family member or other reason, or a physical failure of the communication channel may have happened, and the first customer may not be in a position to re-initiate the first communication either via the same communication channel, e.g., the phone, or via another communication channel, e.g., chat messaging, after termination of the first communication. If the first communication is not terminated at step S408, then the PCM module 302 continues the first communication with the first customer at step S402.

In example embodiments, if the PCM module 302 determines at step S408 that the first communication is terminated, the PCM module 302 stores information related to the first stage of the service request, also referred as first stage information, in a memory of the available services database 206(3) at step S410. In an example embodiment, the first stage information that is stored by the PCM module 302 includes the portion of the service request that has been completed prior to termination of the communication, and a status of completion of the service request. For example, the portion of the service request may include an identification of items completed or that needs to be completed as part of the service request. In example embodiments, the first stage information may include information and/or data received from the client during an unfinished loan application, an unfinished transaction, an incomplete investment recommendation, or an incomplete bill payment process. Accordingly, in example embodiments, the PCM module 302 stores the status of completion of the service request, such as whether the service request is completed or incomplete, and other information or data related to the unfinished loan application, unfinished transaction, incomplete investment recommendation, or incomplete bill payment in the available services database 206(3) at step S410.

In example embodiments, at step S412, the PCM module 302 receives a second communication from a second customer via a second communication channel, in example embodiments. In example embodiments, the PCM module 302 receives the second communication from the second customer via one of, e.g., an email, a social network, a smart speaker or voice-activated instructions, a telephone, text messaging, chat messaging, and personal appearance at a branch location. In example embodiments, the second communication may be related to one or more of a plurality of services such as, e.g., a bill payment, a loan application, and the like, or may be related to the first stage information that is stored at step S408. In example embodiments, the PCM module 302, upon receiving the second communication, determines the identity or profile of the second customer initiating the second communication, the communication channel used by the second customer, and the service request. In example embodiments, the identity of the second customer includes a name of the second customer, a physical address of the second customer, a telephone number of the second customer, an internet address, e.g., an IP address, of a device used by the second customer, a social security number of the second customer, or other identifying characteristic or code unique to the second customer. In example embodiments, the PCM module 302 determines the identity of the second customer by, e.g., recognizing a voice of the second customer, receiving a name or a code provided by the second customer, recognizing an internet address of the second customer, and/or determining a geolocation of the second customer by via the recognized internet address of the second customer. In example embodiments, at step S412, the PCM module 302 stores the second customer identification in the customer ID database 206(2) illustrated in FIG. 3.

At step S414, the PCM module 302 stores the contextual information of the second communication with the second customer. In example embodiments, the contextual information of the second communication may include any one of a nature of a service request, a customer sentiment with respect to the service request, a parameter of a transaction, e.g., a price or interest rate, an asset involved in the transaction, e.g., a car or a house, and/or a time or date of the service request. In example embodiments, at step S414, the PCM module 302 stores the contextual information of the second communication in the contextual information database 206(1) illustrated in FIG. 3.

At step S416, the PCM module 302 determines whether the second communication relates to the same service request as the first communication based on information stored at step S410 or step S406, and whether the second customer is the same as the first customer. In example embodiments, if at step S416, the PCM module 302 determines that the second communication does not relate to the same service request as the first communication, or that the second customer is not the same as the first customer, then the PCM module 302 continues communicating with the second customer, and/or continues communicating with respect to the second service request separately from the first customer and/or the first service request, at step S412.

In example embodiments, if the PCM module 302 determines that the second communication relates to the same or equivalent service request as the first communication and/or if the second customer is the same as the first customer at step S416, then at step S418, the PCM module 302 retrieves the information related to the context of the first communication from the context database 206(1).

In example embodiments, at step S420, the PCM module 302 retrieves the information related to the first stage of the service request from the available services database 206(3). In example embodiments, the PCM module 302 displays on a display device the contextual information of the first and second communication with the same customer relative to the same service request. Accordingly, the entire context of all the communications with a given customer, as well as the status of completion of the service request, are displayed.

In example embodiments, at step S422, after having retrieved the information related to the context of the first communication and the information related to the first stage of the service request, the PCM module 302 resumes providing the requested service to the first customer, which in this case is the same as the second customer. In example embodiments, at step S422, the PCM module 302 resumes providing the requested service to the customer from the first stage of completion of the service request. As a result, the PCM module 302 avoids repeating the portions of the response to the service request that have already been performed and can take advantage of the information gathered and actions taken as described in steps S402-S410.

As a result, when a customer initiates a communication to request a service and the communication is interrupted, there is no loss of information or time due to repeating steps previously performed when the communication is re-initiated by the customer, even if the communication is re-initiated via a different communication channel. In example embodiments, if the customer's first communication at step S402 is received via telephone, and the customer's latest communication at step S412 is received via chat messaging, then the PCM module 302 continues the communication with the customer at step S422 via chat messaging as well because the chat messaging is the current communication channel selected by the customer. As a result, continuity and persistence of the communication with the customer can be achieved.

In example embodiments, at step S422, the PCM module 302 stores information related to a second stage of completion of the customer's service request, the second stage being the stage that is subsequent to the interruption of the first communication with the customer, in a memory of the available services database 206(3).

Accordingly, in example embodiments, the PCM module 302 can seamlessly resume the communication with the customer via the communication channel used by the customer in the customer's latest communication, in this example the customer's second communication, as if the communication had not been interrupted, with no loss of time or effort due to repeating steps previously performed.

FIGS. 5A-5D illustrate a process for persistent interaction via a plurality of communication channels, according to an example embodiment.

In FIG. 5A, a customer, designated as "Kim," instructs the service provider, e.g., a bank, to pay a bill, via chat messaging from her smart phone, according to an example embodiment. Accordingly, Kim contacts the service provider via chat messaging, and FIG. 5A illustrates Kim's smart phone screen during the service provider's handling of the service request. With reference to FIG. 4A, this step is similar to step S402. In example embodiments, the service provider initiates a response by retrieving the customer information from a customer database, and matching the retrieved customer information with the customer request which, in this case, is to "Pay AT&T bill." With reference to FIG. 4A, this step is similar to step S404. In this example embodiment and with reference to FIG. 3, the PCM module 302 identifies the identity of the customer, and retrieves the customer information from the customer ID database 206 (2). In example embodiments, with reference to FIGS. 3 and 4A, the PCM module 302 stores contextual information, which may include the reason for the customer communication and the requested transaction, i.e., to pay a particular bill, in the context database 206(1). With reference to FIG. 4A, this step is similar to step S406. The PCM module 302 then provides Kim with a number of options on how to fulfill the customer request. In example embodiments, the service provider provides a number of options to Kim: "Pay in full," "Pay minimum," and "I'll pick the amount." In example embodiments, this first communication between Kim and the service provider is performed via chat messaging, and has been accidentally or intentionally interrupted. In response, the PCM module 302 stores information related to this first stage of response to Kim's service request in the available services database 206(3). With reference to FIG. 4A, this step is similar to step S410.

In FIG. 5B, Kim initiates a second communication at a later time to instruct the service provider to fulfill the request by selecting one of the provided options illustrated in FIG. 5A. In example embodiments, the communication channel utilized by Kim in initiating the second communication is also chat messaging, but this time via Kim's home computer, and FIG. 5B illustrates Kim's home computer screen during the service provider's handling of the service request. With reference to FIGS. 3 and 4A, the PCM module 302 establishes Kim's identity by, for example, comparing Kim's computer home IP address to an IP address stored in the customer ID database 206(2) associated with Kim, and retrieves the previously stored contextual information of Kim's first communication from the contextual information database 206(1). Accordingly, the PCM module 302 retrieves up-to-date information on the requested service, and can resume the interaction with Kim as if the first communication had not been interrupted, with no loss of time or effort in responding to Kim's service request due to repeating steps previously performed. As such, in example embodiments, Kim instructs the service provider to fulfill the request by selecting one of the provided options. Accordingly, at the time where Kim instructs the service provider to "Pay in full," with reference to FIG. 3, the PCM module 302 receives the instruction from Kim via the chat messaging channel. In example embodiments, the PCM module 302 stores this second stage of the conversation in a memory, and also stores the contextual information related to this second communication, which includes the fact that the request to pay a bill, the identity of the payee, and Kim's instructions to pay the bill "in full." With reference to FIG. 4A, this step is similar to step S414. In example embodiments, this second communication may be accidentally or intentionally interrupted. As a result, and with reference to FIGS. 3 and 4B, the PCM module 302 stores information related to the second stage of completion in the available services database 206(3). With reference to FIG. 4B, this step is similar to step S422.

In FIG. 5C, Kim initiates a third communication with the service provider. In example embodiments, the communication channel utilized by Kim in initiating the third communication is also chat messaging, but this time via her smart phone, and FIG. 5C illustrates Kim's smart phone screen during the service provider's handling of the service request. As illustrated in FIG. 5C, the service provider provided Kim with several options of accounts to use to pay the bill. In example embodiments, Kim instructs the service provider to select one of the available accounts to pay the bill. With reference to FIG. 3, the PCM module 302 establishes Kim's identity and retrieves the previously stored contextual information related to the second communication. Accordingly, the PCM module 302 retrieves up-to-date information on the requested service, and can resume the interaction with Kim as if the second communication had not been interrupted. In example embodiments, this third communication may be accidentally or intentionally interrupted. As a result, and with reference to FIG. 3, the PCM module 302 stores information related to the third stage of completion in the available services database 206(3).

Figure 5D:

In FIG. 5D, Kim initiates a fourth communication to instruct the service provider to confirm payment. In example embodiments, the communication channel utilized by Kim in initiating this fourth communication is also chat messaging via her smart phone, and FIG. 5D illustrates Kim's smart phone screen during the service provider's handling of the service request. With reference to FIG. 3, the PCM module 302 establishes Kim's identity and retrieves the previously stored contextual information of the fourth communication. Accordingly, the PCM module 302 retrieves up-to-date information on the requested service, and can resume the interaction with Kim as if the fourth communication had not been interrupted. As such, in example embodiments, the PCM module 302 confirms payment of the bill to Kim. Accordingly, FIGS. 5A-5D provide an illustration of a plurality of interactions between a customer, "Kim," and a service provider, in this case a bank, and the interactions were initiated by the customer via a plurality of channels. In spite of the multiple interruptions and the use of multiple channels of communication, the bank is able to seamlessly complete Kim's service request with no loss of time or effort due to repeating steps previously performed.

Figure 6:
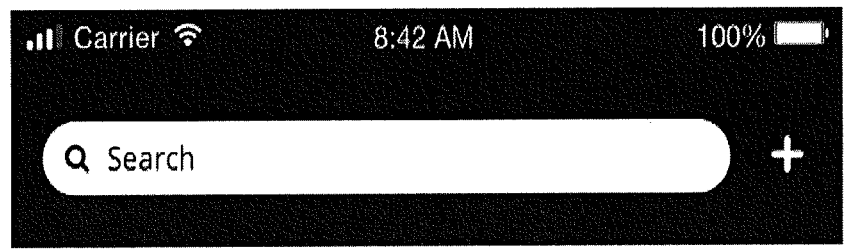
FIG. 6 illustrates a summary of an interaction between a customer and the service provider across multiple channels, according to an example embodiment.
Figure 6:
Figure 6:
Figure 6:
Figure 6:
Figure 6:
Figure 6:

FIG. 6 illustrates the representation of the summary of an interaction between a customer and the service provider across multiple channels over time, according to an example embodiment. For example, the representation of the summary may be a display of the interaction on a screen of the service provider, the display summarizing the totality of the interaction between the customer and the service provider, including the identity of the customer, the various exchanges between the customer and the service provider, and the various communication channels utilized by the customer to initiate a communication with the service provider.

In example embodiments, in FIG. 6, a first interaction starts on November 1 via chat messaging, as evidenced by the image of a service provider employee to the left of the first entry from the bottom. The interaction continues on November 9 via social media, as evidenced by the social-media recognizable icon to the left of the second entry from the bottom. The interaction continues on a later day, labeled as "WED" for Wednesday via chat messaging, as evidenced by the image of a different service provider employee to the left of the third entry from the bottom. In example embodiments, the interaction continues several times during the same Wednesday via a mobile application (e.g., at 8.42 AM), as evidenced by the image of an application ("App Assist") to the left of the fourth entry from the bottom. In example embodiments, the interaction continues at 8.44 AM via a voice communication software, as evidenced by the image of a voice-activated device to the left of the fifth entry from the bottom. In example embodiments, the interaction continues at a current time ("NOW") via the mobile application, as evidenced by the image of an application ("App Assist") to the left of the sixth entry from the bottom. According to example embodiments, FIG. 6 illustrates a persistent communication with a customer across a plurality of communication channels, namely via chat messaging, social network, smart phone application and voice-activated device, over time. In example embodiments, the persistent communication is performed without loss of transaction or identity information that may otherwise take place be due to interrupted communication or to the failure of one of the communication channel.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects.

Although the invention has been described with reference to particular processes, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory (RAM) or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in example embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for achieving persistent interaction via a plurality of communication channels, the method being implemented by a processor on a computing device, the method comprising:
   receiving, by the processor, a first communication via a first graphical user interface of a first channel of the plurality of communication channels, the first communication including a first service request,
      wherein the plurality of communication channels include at least one from among an email, a social network, a smart speaker, a telephone, text messaging, and chat messaging;
   determining, by the processor, a geolocation that corresponds to the first communication based on a first internet address that is extracted from the first communication, the first internet address including a first internet protocol address of a first user device that corresponds to the first channel;
   initiating, by the processor, a first response to the first service request based on the first communication, the first response including a first graphical element that is displayed via the first graphical user interface and first data that corresponds to the first communication;
   storing, by the processor, information related to a first context of the first communication in a memory of the computing device by,
      encoding the information related to the first context with the first communication, the information including the geolocation; and
      persisting the encoded information related to the first context in the memory of the computing device;
   in response to the first communication being terminated:
      storing, by the processor, information related to a first stage of completion of the first response to the first service request in the memory of the computing device;
   receiving, by the processor, a second communication via a second graphical user interface of a second channel of the plurality of communication channels, the second communication including a second service request;
   determining, by the processor, a second geolocation that corresponds to the second communication based on a second internet address;
   storing, by the processor, information related to a second context of the second service request in the memory of the computing device;
   determining, by the processor, whether the second service request is equivalent to the first service request based on the encoded information, the first geolocation, and the second geolocation;
   in response to the second service request being equivalent to the first service request:
      retrieving, by the processor, the information related to the first context;
      retrieving, by the processor, the information related to the first stage of completion of the first response to the first service request;
      resuming, by the processor, the first response to the first service request from the first stage of completion based on at least one of the information related to the first context and the information related to the second context; and
      storing, by the processor, information related to a second stage of completion of the first response to the second service request in the memory of the computing device; and
   in response to the first service request being different from the second service request:
      initiating, by the processor, a second response to the second service request based on the second context, the second response including a second graphical element that is displayed via the second graphical user interface and second data that corresponds to the second communication.

2. The method of claim 1, further comprising storing a representation of at least one of the first channel, the second channel, the information related to the first context, the information related to the second context, information related to the first stage of completion, and information related the second state of completion, at a common platform.

3. The method of claim 2, further comprising displaying the representation on a display.

4. The method of claim 1, further comprising:
   determining a first identity of a first customer initiating the first communication, the first communication channel used by the first customer, and the first service request; and determining a second identity of a second customer initiating the second communication, the second communication channel used by the second customer, and the second service request.

5. The method of claim 4, further comprising, when the first service request is equivalent to the second service request, resuming the response to the first service request when the first customer is the same as the second customer.

6. The method of claim 4, wherein
the determining the identity of the first customer comprises obtaining identifying information from the first customer; and
the determining the identity of the second customer comprises obtaining identifying information from the second customer.

7. The method of claim 6, wherein the identifying information comprises at least one of a voice of at least one of the first customer and the second customer, a name or code provided by at least one of the first customer and the second customer, a geolocation of at least one of the first customer and the second customer, and an internet address of at least one of the first customer and the second customer.

8. The method of claim 1, wherein the information related to the first context and the information related to the second context comprise at least one of a nature of a service request, a customer sentiment, a parameter of a transaction, an asset involved in the transaction, and a time or date of the service request.

9. The method of claim 1, further comprising storing a historical record of communications received by at least one of the first customer and the second customer.

10. The method of claim 1, wherein the information related to the first stage comprises information received during at least one of an unfinished loan application, an unfinished transaction, an incomplete investment recommendation, and an incomplete bill payment.

11. A computing device configured to implement an execution of a method for achieving persistent interaction via a plurality of communication channels, the computing device comprising:
a display screen;
a processor;
a memory; and
a communication interface coupled to each of the processor, the memory, and the display screen,
wherein, when the method is being executed, the processor is configured to:
receive, via the communication interface, a first communication via a first graphical user interface of a first channel of the plurality of communication channels, the first communication including a first service request,
wherein the plurality of communication channels include at least one from among an email, a social network, a smart speaker, a telephone, text messaging, and chat messaging;
determining, by the processor, a geolocation that corresponds to the first communication based on a first internet address that is extracted from the first communication, the first internet address including a first internet protocol address of a first user device that corresponds to the first channel;
initiate a first response to the first service request based on the first communication, the first response including a first graphical element that is displayed via the first graphical user interface and first data that corresponds to the first communication;
store information related to a first context of the first communication in a memory of the computing device by causing the processor to:
encode the information related to the first context with the first communication, the information including the geolocation; and
persist the encoded information related to the first context in the memory of the computing device;
in response to the first communication being terminated:
store information related to a first stage of completion of the response to the first service request in the memory of the computing device;
receive a second communication via a second graphical user interface of a second channel of the plurality of communication channels, the second communication including a second service request;
determine a second geolocation that corresponds to the second communication based on a second internet address;
store information related to a second context of the second service request in the memory of the computing device;
determine whether the second service request is equivalent to the first service request based on the encoded information, the first geolocation, and the second geolocation;
in response to the second service request being equivalent to the first service request:
retrieve the information related to the first context;
retrieve the information related to the first stage of completion of the first response to the first service request;
resume the first response to the first service request from the first stage of completion based on at least one of the information related to the first context and the information related to the second context; and
store information related to a second stage of completion of the first response to the second service request in the memory of the computing device; and
in response to the first service request being different from the second service request:
initiate a second response to the second service request based on the second context, the second response including a second graphical element that is displayed via the second graphical user interface and second data that corresponds to the second communication.

12. The computing device of claim 11, wherein the processor is further configured to display a representation of at least one of the first channel, the second channel, the information related to the first context, the information related to the second context, information related to the first stage of completion, and information related the second state of completion, on a display.

13. The computing device of claim 11, wherein the information related to the first stage comprises information received during at least one of an unfinished loan application, an unfinished transaction, an incomplete investment recommendation, and an incomplete bill payment.

14. The computing device of claim 11, wherein the processor is further configured to:

determine a first identity of a first customer initiating the first communication, the first communication channel used by the first customer, and the first service request; and determine a second identity of a second customer initiating the second communication, the second communication channel used by the second customer, and the second service request.

15. The computing device of claim 14, wherein the processor is further configured to, when the first service request is equivalent to the second service request, resume the response to the first service request when the first customer is the same as the second customer.

16. The computing device of claim 14, wherein the determining the identity of the first customer comprises obtaining identifying information from the first customer; and the determining the identity of the second customer comprises obtaining identifying information from the second customer.

17. The computing device of claim 16, wherein the identifying information comprises at least one of a voice of at least one of the first customer and the second customer, a name or code provided by at least one of the first customer and the second customer, a geolocation of at least one of the first customer and the second customer, and an internet address of at least one of the first customer and the second customer.

18. The computing device of claim 11, wherein the information related to the first context and the information related to the second context comprise at least one of a nature of the service request, a customer sentiment, a parameter of a transaction, an asset involved in the transaction, and a time or date of the service request.

19. The computing device of claim 11, wherein the processor is further configured to store a historical record of communications received by at least one of the first customer and the second customer.

\* \* \* \* \*